Patented May 13, 1952

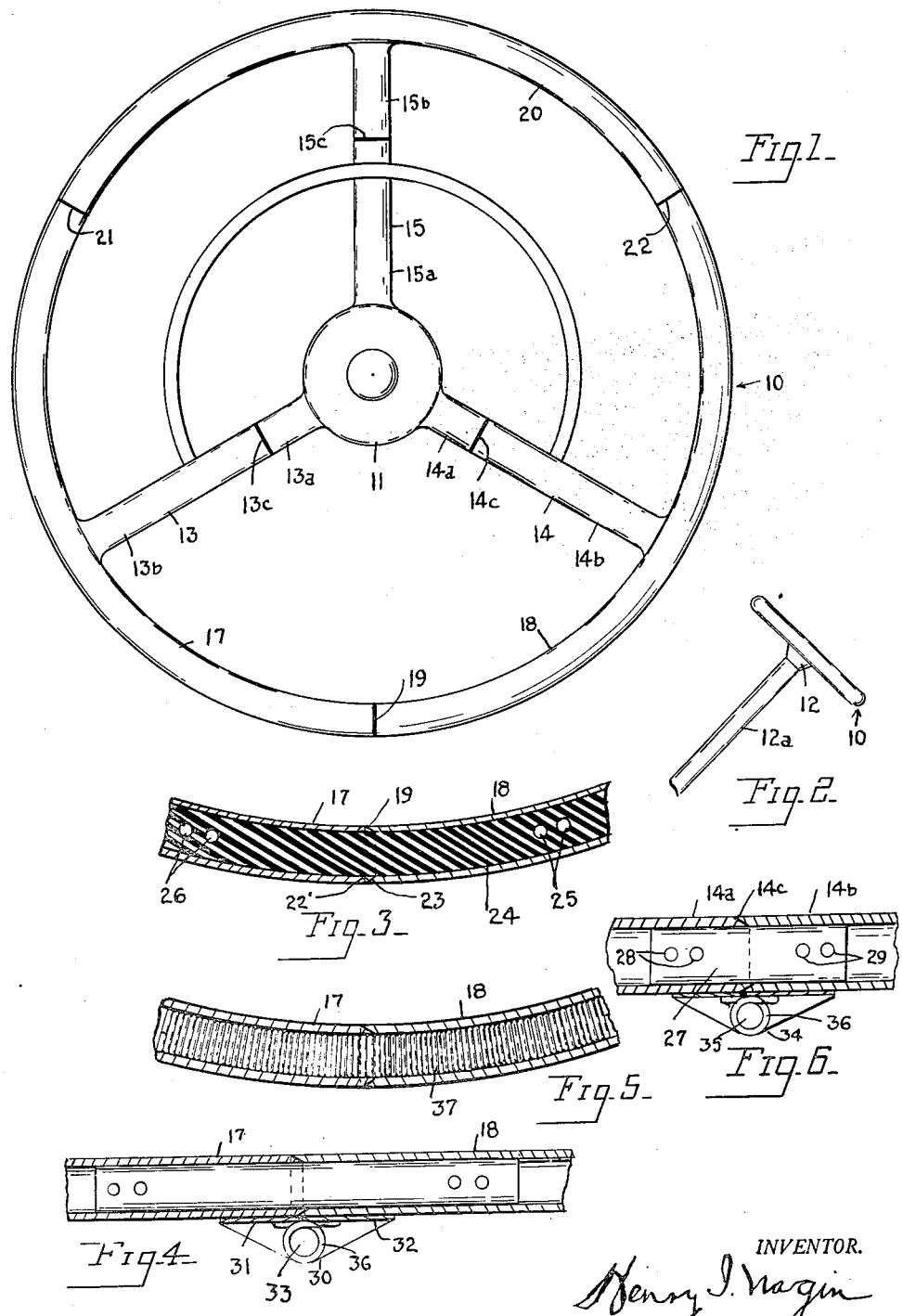

2,596,784

UNITED STATES PATENT OFFICE 2,596,784

SAFETY AUTOMOBILE STEERING WHEEL

Henry J. Nagin, Brooklyn, N. Y.

Application March 22, 1951, Serial No. 216,901

6 Claims. (Cl. 74—552)

1

This invention relates to new and useful improvements in safety steering wheels for automobiles, buses and trucks, and similar vehicles, including motor boats, wherein steering is accomplished by the use of a hand wheel, mounted on a steering post which has operative connections with mechanism for steering the front wheels of the automobile, bus or truck, or the rudder of the motor boat.

One of the objects of the invention is the provision of a steering wheel which will remain stable or rigid under normal operating conditions, and which will collapse into hinged sections, when an abnormal load is violently imposed on the steering wheel, as during a collision with another road vehicle, or with an object or vehicle at rest.

The significant object of the invention is to provide a steering wheel which will collapse upon itself, when the driver of the road vehicle is violently thrown forwardly against the wheel due to the force of momentum of the rapidly moving vehicle being suddenly arrested at the moment of a collision with another vehicle or object in its path; the improved construction being designed to prevent the steering wheel being driven into the chest of the driver's body, crushing the ribs and vital organs of the body of the driver, by causing the steering wheel to collapse at the moment of impact with the driver's body, instead of being driven into the driver's body.

With the above and other objects in view the invention comprises certain new and useful constructions, combinations and arrangements of parts, clearly described in the following specification, and fully illustrated in the drawings, in which:

Fig. 1 is a top plan view of a steering wheel constructed in accordance with my invention.

Fig. 2 is a side view thereof, shown on a reduced scale, attached to a conventional steering post.

Fig. 3 is a detail sectional view, taken on line 3—3 of Fig. 1, looking in the direction of the arrows.

Fig. 4 another similar sectional view, taken at right angles to Fig. 3, showing one of the joint hinges.

Fig. 5 is a detail sectional view showing a coiled spring insert for the tubular steering wheel.

Fig. 6 is a sectional view of one of the spokes showing the joint hinges.

Referring to the accompanying drawings, which illustrate the practical embodiment of my invention, 10 designates a steering wheel, having a hub 11, provided with the usual socket 12 to receive the steering post 12a.

From the hub 11 the spokes 13 and 14 radiate at 120 degrees from each other, and from the same hub 11 another spoke 15 radiates at 120 degrees from the spokes 13 and 14.

The spoke 13 includes the rigid inner short arm

2 or section 13a and the outer long arm or section 13b, which is joined to the outer end of the inner short arm section by means of the brazed or hard soldered joint 13c. The spoke 14 includes the inner short arm or section 14a and the outer long arm or section 14b, which are jointed to each other by means of the brazed or hard soldered joint 14c. The spoke 15 includes an inner long arm or section 15a and an outer short arm or section 15b, which are jointed to each other by means of the brazed or hard soldered joint 15c.

Each and all of the radial spokes 13, 14 and 15 is of tubular metal construction, and the inner and outer arms of each spoke are disposed in exact axial alignment.

The inner short spoke arms or sections 13a and 14a are rigidly connected to the hub 11, and the mating outer long spoke arms 13b and 14b are rigidly connected with the tubular wheel ring sections 17 and 18, which are jointed to each other by the brazed or hard soldered joint 19. The inner short spoke arm 15a is rigidly connected to the hub 11, and the outer long spoke arm 15b is rigidly connected to the tubular ring section 20.

The three ring sections 17, 19 and 20 comprise a circular ring body, which is gripped by the driver to produce the required steering movements and control of the moving vehicle. The three ring sections are shown to be of equal arcuate length, and the ring section 20 is connected to the end of the ring section 17 by means of the brazed or hard soldered joint 21, and is connected by the brazed or hard soldered joint 22 with the ring section 18, to form a true circle.

Each of the brazed joints of the spokes and each of the brazed joints of the ring include mating bevelled edges 22' and 23, and the brazing flux or hard solder material bonding these bevelled edges to each other.

Across the joint of each pair of ends of the ring frame sections a flexible rubber core or member 24 is inserted, which extends well beyond the brazed joint. Transverse pins 25 extend through one end of this rubber core or member 24 and through the enclosing ring section, and transverse pins 26 extend through the other end of the rubber core or member and through the adjacent enclosing ring section. These rubber core rods or members serve to stiffen the ring frame for normal use, but are designed to allow a yield between the ring sections, when the body of the driver is violently thrown against the steering wheel, as a result of the sudden interference with the movement of the road vehicle.

Across the joint between any two spoke sections a rubber rod or core member 27 is placed, and its ends secured by the transverse end pins 28 and 29, extended through the spoke sections or arms. On the underside of the ring frame, at each brazed joint thereof, a hinge 30, comprising the hinge leaves 31 and 32 and the pintle 33, is secured by welding, brazing or hard solder, or otherwise, so that the axis of the pintle 33 is disposed in line with the brazed joint. Under the brazed joint of each spoke another hinge 34 is secured in the same manner, as by welding, brazing or hard solder, or otherwise, so that the pintle 35 thereof will lie directly under the brazed joint. Each pintle is provided with a coiled spring 36, the opposing ends of which engage the leaves of the hinge, so that the tension of the spring tends to keep the hinge normally extended to open position.

In place of the rubber core rod or member for the hollow or tubular spokes and for the hollow or tubular steering wheel, I may use a coil spring 37, mounted to straddle the brazed or breakable joint between the two members.

The rubber used may be elastic or partly elastic, and stiffens the joint for normal use, but provides a spring yielding joint or breaking point, to permit the sections of the tubular frame ring and the spoke sections to yield relative to each other when the steering wheel is subjected to the pressure generated by the violence of a collision.

In normal use the safety steering wheel operates like any other steering wheel for automobiles, trucks, buses and motor boats, and any ignition or fuel control mechanism or elements may be combined with the wheel in the usual manner.

When the vehicle collides with any object, while going at great velocity or speed, and the force of momentum throws the body of the driver forwardly against the wheel in great violence, the frame ring or rim of the wheel and the spokes will collapse in a yielding movement, because the resistance offered by the brazed joints will be less than the stock of the tubular rim or ring and of the spokes, and a bending action will develop at the joints, due to the yielding movement of the outermost sections of the spokes and all of the sections of the rim or ring of the steering wheel.

In the case of a steering wheel constructed with rubber rods across the breaking joints, the rubber rods or core members will yield under the tensional pulls developed during the yielding of the spokes and the rim sections, and at the same time the spring hinges for all of the rim section joints and all of the spoke joints will yield, to cause the entire rim to give with the forward violent movement of the body of the driver, and the spring yielding action of the collapsible steering wheel will act as a shock absorber for the body of the driver, with the result that serious injury to the body of the driver will be avoided, and life will be saved.

The strength of the brazed or solder joints may be varied according to experience, and would be influenced by the area of the meeting faces of the ends joined by solder or brazing to each other, and the coverage of these faces with the solder or brazing flux.

I claim:

1. A vehicle steering wheel, comprising a hub securable to the steering post of a driven vehicle, inner spoke sections rigidly connected with the hub and disposed in radial relation thereto, a circular rim having sections united to each other by breakable joints, and outer spoke sections axially bonded to the inner spoke sections by breakable joints and having rigid joint connection with the rim sections, said breakable joints serving to hold the rim and spoke sections in normal operative relation with each other and being capable of resisting normal steering thrusts imposed in the rotative operation of the steering wheel and being adapted to yield on each other only when the body of the driver is violently propelled against the steering wheel, and to then yield in the direction of the movement of the body of the driver.

2. A vehicle steering wheel, comprising a hub securable to the steering post of a driven vehicle, a plurality of spoke sections rigidly connected with the hub, a rim comprising a plurality of sections disposed in circular alignment with each other, and a spoke section rigidly connected with each of the rim sections and having a break joint connection with the outer end of one of the spoke sections of the hub, the meeting ends of the rim sections being connected with each other by means of breakable joints.

3. A vehicle steering wheel, comprising a hub having a plurality of outwardly extending spoke arms, a wheel rim having a plurality of sections disposed in circular formation, a spoke arm connected with each spoke section by a spring hinge and having rigid connection with one of the rim sections, and a spring yielding element bridging each of the joints between the spoke arms and sections and between the rim sections.

4. An automobile steering wheel, comprising a hub having a plurality of integral spoke arms, a wheel rim consisting of a plurality of sections having end abutting engagement with each other in circular formation, said rim sections being tubular, a resilient bridge member enclosed by the tubular rim sections and bridging the joint therebetween the rim sections, a rupturable bond uniting the ends of the adjacent rim sections to each other, and a spoke section carried by each rim section and united to a mating spoke section of the hub by a joint rupturable when external pressure is applied to the wheel.

5. A steering wheel for driven vehicles, comprising a hub, a plurality of spoke sections connected rigidly with the hub, each being of tubular construction, a rim having a plurality of tubular sections, each section being a part of a circle, a spoke section rigidly connected with each rim section and disposed in axial alignment with one of the spoke sections of the hub, said rim spoke sections being tubular, spring hinges attached to the adjacent spoke sections under the joint between the confronting ends thereof, a coiled spring disposed in the adjacent hollow spoke sections to bridge said joint, and a spring hinge connecting the adjacent ends of the rim sections.

6. A steering wheel for driven vehicles, comprising a rim constructed in sections of tubular construction, a hub having rigid spoke sections of tubular construction, a spoke section of tubular construction integral with each rim section, a resilient rubber rod enclosed by the tubular rim sections to bridge the joint between adjacent rim sections, and a rubber rod enclosed by the adjacent spoke sections to bridge the joint.

HENRY J. NAGIN.

REFERENCES CITED

The following references are of record in the file of this patent:

UNITED STATES PATENTS

| Number | Name | Date |
| --- | --- | --- |
| 2,155,123 | Gerardy | Apr. 18, 1939 |
| 2,379,492 | Micuta | July 3, 1945 |